Sept. 10, 1929.   J. W. H. RANDALL   1,727,937
LAMINATED GLASS AND PROCESS FOR PRODUCING THE SAME
Original Filed Aug. 8, 1927

Inventor
James W. H. Randall.
By Frank Fraser
Attorney

Patented Sept. 10, 1929.

1,727,937

UNITED STATES PATENT OFFICE.

JAMES W. H. RANDALL, OF NEW YORK, N. Y., ASSIGNOR TO THE LIBBEY-OWENS SHEET GLASS COMPANY, OF TOLEDO, OHIO, A CORPORATION OF OHIO.

LAMINATED GLASS AND PROCESS FOR PRODUCING THE SAME.

Application filed August 8, 1927, Serial No. 211,314. Renewed January 26, 1929.

The present invention relates to laminated glass and to the process of producing the same.

An important object of the invention is to provide as a new article of manufacture, a sheet of laminated glass and the process of producing the same, wherein a suitable woven material is treated with a preferably colorless resin, after which the resin coated material is united to a sheet or a plurality of sheets of glass.

Another object of the invention is to provide an improved process for producing laminated glass, wherein a preferably woven fibrous material is treated with a substantially colorless resin, the resin and material being of such a nature that in the event the material is not originally transparent, it will be rendered transparent during the course of the manufacture of the laminated sheet so that the finished product will be perfectly clear and transparent.

Still another object of the invention is to treat a preferably finely woven fibrous material made of silk, rayon, cellulose esters, etc. with preferably colorless synthetic resins such as those resulting from the combination of various aldehydes with phenol, urea, thiourea, casein, etc.; glycerolphthalein resins as well as certain esters of the dibasic acids, etc., subjecting the resin-treated material preferably to the action of heat and pressure to polymerize or condense said resin or combination of resins into a transparent body, the combination of resin and fibrous material forming a material suitable for use in the manufacture of laminated glass.

A further object of the invention is to provide a process of this nature wherein a woven fabric is treated with synthetic resins, or the like, produced by condensation, polymerization or other reaction from phenol or its homologues, formaldehyde or its homologues, furfural, phthalic anhydride, glycerol or the like, or the congeners, and then uniting the same to a sheet or a plurality of sheets of glass.

Other objects and advantages of the invention will become more apparent during the course of the following description.

Figure 1:
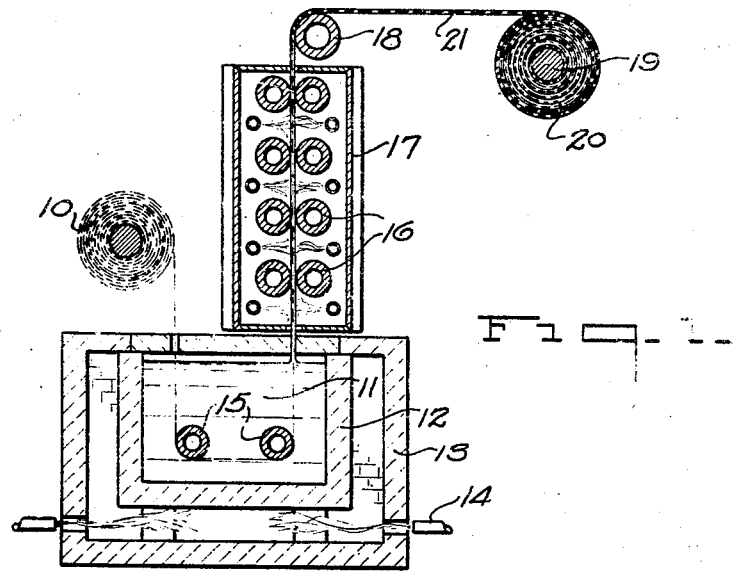
Figures 2, 3:
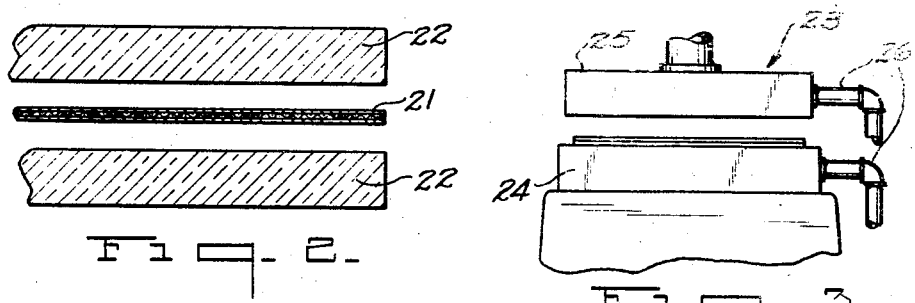
Figures 4, 5:
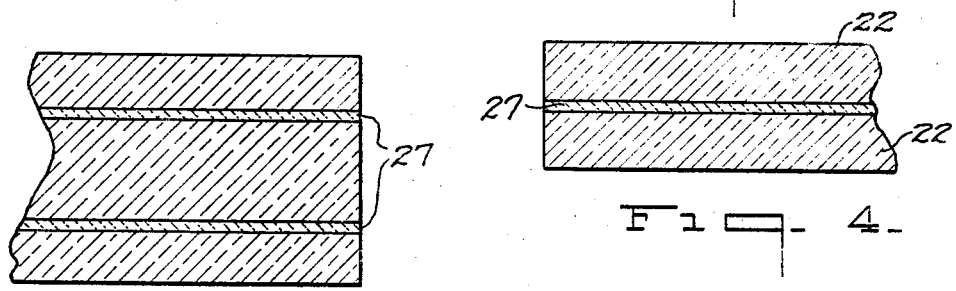

In the drawings wherein like numerals are employed to designate like parts throughout the same, Fig. 1 is a diagrammatic sectional view illustrating the coating of a suitable material with a suitable resin, Fig. 2 illustrates diagrammatically in section a resin-coated fibrous material interposed between two sheets of glass, Fig. 3 illustrates diagrammatically a press which may be used to unite the laminations, Fig. 4 is a fragmentary sectional view of the finished product, and Fig. 5 is a similar view of a slightly modified form of product.

Laminated glass is the name used to designate a composite structure comprising two or more sheets of glass and a sheet or more of some non-brittle material, the three being united. In the past, sheets of celluloid or pyroxyline have been cemented or otherwise united to the sheets of glass. For numerous reasons, such as discoloration, deterioration, etc., sheet celluloid is not particularly satisfactory for use in the manufacture of laminated glass.

In following out the present invention, a suitable fibrous material, which is preferably finely woven, is treated with a resin, the selection being such that the finished product will be transparent. There are quite a number of fibrous materials that may be used made of materials such as silk, rayon, cellulose esters, etc. As examples of resins that may be used, the following colorless or substantially colorless resins are set forth,—synthetic resins, or the like, produced by condensation, polymerization or other reaction from phenol or its homologues, formaldehyde or its homologues, furfural, phthalic anhydride, glycerol or the like, or the congeners. Some resins may have a partially solvent action on the fibrous materials, while others may tend to gelatinize the same, but in all events I prefer to use a combination of fibrous material and resin where the resultant product will be transparent. In some instances, it may be necessary to apply heat and pressure to transform the fibrous material to a transparent member, but this is not objectionable as it is customary to unite the laminations in the manufacture of laminated glass by the action of heat and pressure. In fact, the use of heat and pressure is contemplated in the present invention. However, in some instances, the mere combination of the resin and the fabric may be sufficient to make the fabric transparent, and in some cases it may be desirable to use a suitable solvent cement or the like to assist in obtaining a bond between the laminations.

The drawings illustrate diagrammatically one method in which the invention may be practiced, but it is to be understood that the drawings are not to be taken by way of limitation as far as the invention is concerned.

In Fig. 1, the numeral 10 represents a roll of some suitable preferably finely woven fibrous material or fabric such as silk, rayon, cellulose esters, etc. The fabric is adapted to be impregnated by a suitable resin, and to this end may be passed through a bath of some suitable resin such as phenol-formaldehyde, urea-formaldehyde, etc., dissolved in a suitable volatile solvent to which may or may not be added a modifier or plasticizing agent as required for the specific resin. Of course the process is not limited to any specific resin, and by resin is meant the so-called synthetic resins produced by polymerization or condensation, or a combination of the two reactions. Such synthetic resins as phenol-formaldehyde, urea-formaldehyde, thiourea-formaldehyde, casein-formaldehyde, may be used. The formaldehyde may be replaced by other aldehydes without injury to the process. Resins consisting of polymerized esters of the dibasic acids such as succinic are useful and particularly a colorless polymerized ester of itaconic acid as well as the resins resulting from the combination of glycerol and phthalic anhydride.

The bath of liquid or semi-liquid resin 11, or a solution thereof, may be contained in a receptacle 12 preferably surrounded by a heated compartment 13. The compartment may be heated by the circulation of steam or other medium or the like. Rolls 15 may be arranged as shown in Fig. 1, so that the fabric may be passed through the bath. Rolls 16 are provided to withdraw the resin-impregnated fabric from the bath 11, and a plurality of such rolls may be provided and are preferably arranged in a suitable drying compartment 17, wherein the volatile solvent may be evaporated off and recovered by any of the well known methods. The coated fabric may then be deflected over a bending roll 18 and wound on a reel 19 to form a roll of resin-coated fabric 20. In some instances, the fabric may be made transparent by the mere combination with the resin 11, or in other combinations the fabric may retain its original shape and color after it has become impregnated with the resin.

In Fig. 2 is illustrated superimposed laminations wherein the intermediate lamination 21 represents a coated fabric or other fibrous material, where the fabric retains its original shape. Of course the showing in Fig. 2 is merely diagrammatic and is not to be taken as an accurate representation of the fabric after it has been coated with the resin 11. The inner membrane or lamination 21 is disposed between sheets of glass 22 which are preferably transparent and whose surfaces may be ground and polished, or not, as desired.

In some instances it will be necessary to apply a suitable cement, solvent, or the like to the laminations to obtain a suitable bond, while in other instances the resin itself, being in a plastic or semi-plastic condition, will be sufficient to create a bond between the laminations. After the laminations have been suitably placed with respect to one another, they are united in a press 23 where heat and pressure may be applied. The press 23 may comprise a lower platen 24 and an upper platen 25, while the platens may be heated by circulation of steam or other mediums 26 communicating with said platens. After the application of heat and pressure in the press 23, the laminations will be firmly united to ecah other, while the inner membrane comprising the fabric and resin will be rendered transparent, and, practically speaking, colorless. Fig. 4 represents diagrammatically the finished sheet wherein the inner membrane 27 has no definite structure such as is set forth in Fig. 2, illustrating that the mesh has lost its visible structure. Here again it is to be understood that the fibrous material may retain a fabric formation, but due to its transparency and the resin entirely surrounding the same, vision through the finished product will not be distorted. Obviously, if a colored sheet of laminated glass is desired, either the sheets may be colored or the interior membrane.

As stated above, some resins may have a slight solvent action on the fibrous material while in other instances the resins may have a tendency to gelatinize the material. Further, there are some resins that when heated do not adhere very firmly to glass, and therefore an additional resinous cement, or other cement, may be used to assist in obtaining a bond between the laminations. Further, the invention is not limited to any specific resin or group of resins.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Broad claims involving the use of resins per se as the non-brittle membrane, skin coat, or both, between two sheets of glass are not made in this application because such claims are being prosecuted in my co-pending applications Serial No. 233,831; Serial No. 247,032; Serial No. 256,582; Serial No. 256,584; Serial No. 271,441; Serial No. 256,591; and Serial No. 247,031.

Claims:

1. The process of producing laminated glass consisting in arranging a woven fibrous material between a plurality of sheets of glass, and then uniting the same.

2. The process of producing laminated glass consisting in arranging a woven fibrous material between a plurality of sheets of glass, said material being rendered transparent, and uniting the laminations.

3. The process of producing laminated glass consisting in coating a woven fibrous material with a substance capable of making the fibrous material transparent, and then uniting said coated material to glass sheets.

4. The process of producing laminated glass consisting in coating a woven fibrous material with a substance which, when subjected to the action of heat and pressure, will render the fibrous material transparent, interposing said material between two sheets of glass, and applying heat and pressure thereto to render the material transparent and to unite the sheets of glass to said material.

5. The process of producing laminated glass consisting in subjecting a woven fibrous material to the action of a resin, and then uniting the same to a sheet of glass.

6. The process of producing laminated glass consisting in coating a woven fibrous material with a resin, interposing the same between two sheets of glass, and then uniting the same.

7. The process of producing laminated glass consisting in coating a woven material with resin, and then uniting the same to a sheet of glass.

8. The process of producing laminated glass consisting in coating a woven material with a resin, interposing the same between two sheets of glass, and then applying heat and pressure thereto to unite the same.

9. The process of producing laminated glass consisting in coating a woven fibrous material with a substantially colorless resin, and then uniting the same to a sheet of glass.

10. The process of producing laminated glass consisting in impregnating a woven fibrous material with a resin, uniting the same to two sheets of glass, and rendering the impregnated fibrous material transparent by the action of heat.

11. The process of producing laminated glass consisting in impregnating a woven fibrous material with a resin, uniting the same to two sheets of glass, and rendering the impregnated fibrous material transparent by the action of heat and pressure.

12. The process of producing laminated glass consisting in impregnating a woven fibrous material with a substantially colorless resin, placing said impregnated material between a plurality of sheets of glass, and bonding the whole into a unit by the action of heat and pressure.

13. The process of producing laminated glass consisting in impregnating a woven fibrous material with a substantially colorless resin which will render the fibrous material transparent under the action of heat and pressure, and uniting the same to two sheets of glass.

14. As a new article of manufacture, a sheet of laminated glass including a woven fibrous lamination.

15. As a new article of manufacture, a sheet of laminated glass including a resin impregnated woven fibrous lamination.

16. As a new article of manufacture, a sheet of laminated glass including a woven fibrous lamination rendered transparent by the action of a resin.

17. As a new article of manufacture, a sheet of laminated glass including a resin-impregnated woven fibrous lamination rendered transparent by the action of heat.

18. As a new article of manufacture, a sheet of laminated glass including a fibrous material impregnated with a substantially colorless resin.

19. As a new article of manufacture, a sheet of laminated glass including a woven fibrous material rendered transparent.

Signed at New York, in the county of New York and State of New York, this first day of August, 1927.

JAMES W. H. RANDALL.